United States Patent

Beadman et al.

[11] Patent Number: 5,733,051
[45] Date of Patent: *Mar. 31, 1998

[54] LABEL PRINTING APPARATUS

[75] Inventors: Michael A. Beadman, Royston; Paul Martin, Great Shelford, both of United Kingdom

[73] Assignee: Esselte N.V., St Niklaas, Belgium

[*] Notice: The term of this patent shall not extend beyond the expiration date of Pat. No. 5,595,450.

[21] Appl. No.: 692,664

[22] Filed: Aug. 6, 1996

Related U.S. Application Data

[63] Continuation of Ser. No. 71,120, Jun. 2, 1993.

[30] Foreign Application Priority Data

Jun. 11, 1992 [GB] United Kingdom ............... 9212439
Jan. 15, 1993 [GB] United Kingdom ............... 9300748

[51] Int. Cl.$^6$ ........................................ B41J 3/46
[52] U.S. Cl. .............................. 400/83; 400/615.2
[58] Field of Search ........................ 400/83, 615.2

[56] References Cited

U.S. PATENT DOCUMENTS

| | | | |
|---|---|---|---|
| 4,827,358 | 5/1989 | Matsumoto | 358/296 |
| 5,081,594 | 1/1992 | Horsley | 395/150 |
| 5,117,719 | 6/1992 | Takagi et al. | 83/640 |
| 5,188,469 | 2/1993 | Nagao et al. | 400/615.2 |
| 5,204,959 | 4/1993 | Sakuragi | 395/102 |
| 5,222,818 | 6/1993 | Akiyama et al. | 400/615.2 |
| 5,230,572 | 7/1993 | Hirono | 400/615.2 |
| 5,253,334 | 10/1993 | Kimura | 395/102 |
| 5,302,038 | 4/1994 | Hirono et al. | 400/615.2 |
| 5,314,256 | 5/1994 | Niwa | 400/61 |
| 5,351,064 | 9/1994 | Zenda | 345/132 |
| 5,393,147 | 2/1995 | Ueno et al. | 400/83 |
| 5,503,482 | 4/1996 | Kawakami et al. | 400/83 |
| 5,595,450 | 1/1997 | Beadman et al. | 400/615.2 |

FOREIGN PATENT DOCUMENTS

| | | | |
|---|---|---|---|
| 0 081 096 | 11/1982 | European Pat. Off. | 400/615.2 |
| 0 144 581 | 9/1984 | European Pat. Off. | 400/615.2 |
| 0 447 126 | 3/1991 | European Pat. Off. | 400/615.2 |
| 0 497 352 | 5/1992 | European Pat. Off. | |
| 0 534 794 | 9/1992 | European Pat. Off. | 400/615.2 |
| 3 604 981 | 8/1987 | Germany | 400/615.2 |
| 3 610 182 | 10/1987 | Germany | 400/615.2 |
| 183572 | 8/1991 | Japan | 400/615.2 |
| 2 078 411 | 5/1981 | United Kingdom | 400/615.2 |
| 2 224 913 | 5/1990 | United Kingdom | 400/83 |
| 2 227 112 | 7/1990 | United Kingdom | 400/615.2 |
| 83/0046 | 2/1983 | WIPO | 400/615.2 |
| 92/09 438 | 6/1992 | WIPO | 400/615.2 |

OTHER PUBLICATIONS

Micrografx Draw Plus Software User's Manual (1988).
Microsoft User's Reference Manual (1990), pp. 399–400.

*Primary Examiner*—Edgar S. Burr
*Assistant Examiner*—Steven S. Kelley
*Attorney, Agent, or Firm*—Pennie & Edmonds LLP

[57] ABSTRACT

A label printing device is disclosed in which font data for a plurality of characters is stored. Characters are derived from the font data for displaying and printing in sizes determined by appropriate scaling factors. In this way, characters derived for printing have the same proportion and appearance as characters derived for displaying. Moreover, a large variety of character sizes can be produced both for printing and displaying.

27 Claims, 3 Drawing Sheets

LABEL PRINTING APPARATUS

This is a continuation, of application Ser. No. 08/071, 120, filed Jun. 2, 1993.

FIELD OF THE INVENTION

The present invention relates to label printing apparatus and is particularly concerned with label printing apparatus where the label size is not predetermined by a particular label stock.

BACKGROUND OF THE INVENTION

There are now known thermal printing devices which produce labels having a length corresponding to a message to be printed as defined by a user. Such devices operate with a supply of tape arranged to receive an image and a means for transferring an image onto the tape. In one known device, a tape holding case holds a supply of image receiving tape and a supply of an image transfer ribbon, the image receiving tape and the transfer ribbon being passed in overlap through a print zone of the printing device. At the print zone, a thermal print head cooperates with a platen to transfer an image from the transfer ribbon to the tape. A printing device operating with a tape holding case of this type is described for example in EP-A-0267890 (Varitronics Inc.). In this printing device, the image receiving tape comprises an upper layer for receiving an image which is secured to a releaseable backing layer by a layer of adhesive.

In another device, the construction of the image receiving tape is such that the upper image receiving layer is transparent and receives an image on one of its faces printed as a mirror image so that it is viewed the correct way round through the other face of the tape. In this case, a double-sided adhesive layer can be secured to the upper layer, this double-sided adhesive layer having a releaseable backing layer. This latter arrangement is described for example in EP-A-0322918 and EP-A-0322919 (Brother Kogyo Kabushiki Kaisha).

Printing devices of this type also include a display means and an input means such as a keyboard for selecting characters to be printed. Selected characters are displayed on the display means and in this way a user can compose a label to be printed. When a label has been composed a print instruction is given and the printing device proceeds to print a label. Printing devices of this type also include cutting means to cut off the printed portion of the tape to enable it to be used as a label. For use as a label, the releaseable backing layer is removed from the upper layer to enable the upper layer to be secured to a surface by means of the adhesive layer. In this way, labels having a length and character arrangement determined by a user can be made.

However, the known printing devices have severe limitations as regards their ease of use in composing labels to be printed. In particular the characters displayed by the display means do not bear a relationship in terms of their size, spacing and position to the characters as will be printed out on the finished label. This makes it difficult for a user to perceive properly the final form of the label so that he must in general adopt a process where he composes a label, prints it and then reviews it to see how its format might be improved as regards character size, spacing and layout. Further, the characters displayed on the display are provided specifically for the display from a display font and thus do not resemble the characters to be printed.

The present invention seeks to overcome these difficulties in providing a printing apparatus having display means which is operable as a more useful visual aid to a user of such apparatus.

The present invention also seeks to provide a wider range of character sizes for printing and/or displaying.

SUMMARY OF THE INVENTION

According to the present invention there is provided a label printing apparatus comprising: input means for selecting characters for composing a label to be printed; display means for displaying the characters selected at the input means; printing means for printing said characters on an image receiving tape to produce a label; storage means for storing font data defining a plurality of characters; and a controller for recalling font data for characters selected at said input means and operable to apply a first scaling factor to said font data to produce pixel data for driving the display means to display the character and a second scaling factor to said font data to produce pixel data for driving said printing means to display the character whereby the characters displayed on the display means resemble the characters which are printed by the printing means and differ only in their resolution.

Preferably the font data is Bezier data, defining Bezier points for lines and curves of the character.

In one embodiment, the characters are printed by the printing means with four times the resolution with which they are displayed on the display means. Clearly the difference in resolution is determined by the number of pixels available on the display means as compared with the number of pixels available at the printing means.

Preferably the font data stored in the storage means defines each character within a predetermined character space having a height and a width defined by the nature of the character and its normal spacing with respect to adjacent characters. As common font data is used to produce characters for both the display means and the printing means, the characters will thus be displayed on the display means with spacing proportional to that with which they will be printed by the printing means. Thus, it is possible for a user to see clearly the final form that the label will take.

The Bezier font data defines a character in terms of its relative features. Preferably different sizes of characters can be selected automatically or by a size select switch on the input means, the different sized characters being produced by scaling of the font data stored in the storage means. The size of character then displayed by the display means will reflect the size which has been selected for printing, and will retain its proportionality. Where a label having a plurality of lines is to be printed, with each line perhaps having characters of a different size, the display means is capable of displaying each line with its appropriate character size and proportional spacing so that a user can easily visualize the final label.

The invention thus provides in one aspect font data which is continuously scaleable allowing a label to be reduced in size while maintaining its proportions. In one mode, the user of the apparatus inputs a desired length of label and then inputs a sequence of characters to be printed. The controller then determines the correct width of each character space such that the number of selected characters can be accommodated in the length of the label. Characters of the appropriate size are then displayed, and printed when required. The height of the characters alters with the selected width to maintain proportionality of the character.

In another mode, a user does not himself input the desired length of label but instead selects the character size to be printed and inputs a number of characters. The controller then determines the aggregate of the width of the character spaces selected and from that determines the length of the label.

Normally a label will include not only the print itself but also blank lead and lag areas, the width of which will be calculated by the controller.

According to another aspect of the invention there is provided a method of printing a label using a printing device comprising selecting characters for comprising a label to be printed; recalling from a storage means font data defining said selected characters; applying a first scaling factor to said font data to generate first pixel data defining characters of a first desired size; supplying said first pixel data to a display means for displaying said selected characters; applying a second scaling factor to said font data to generate second pixel data defining characters of a second desired size; and supplying said second pixel data to a printing means of said printing device to print said selected characters.

The controller is preferably also operable to control the display and printing of multiple line labels as follows. If a particular character size is not selected, but a number of characters is input, the controller operates in autosize mode to cause the display means to display characters of the maximum permissible height along a single line. When the next line of characters is input, the controller causes the display means to change the height of the characters in the first line so that they are half the maximum height so that the next line can be displayed. This process continues for subsequent lines of the label. The maximum number of lines which can be printed can be set by the apparatus, and for tape having a breadth of 19 mm (the breadth of the tape corresponding to the direction in which the height of the characters is measured) four lines is an appropriate maximum number. For a printing device capable of accommodating tapes of different widths, the maximum permissible height available on autosize mode will vary with the breadth of tape inserted into the device.

The spacing between the lines is governed by the number of lines. As the number of lines increases the spacing between the lines reduces proportionally with the height of the characters and this too can be displayed on the display means apart only from the difference in resolution.

It will be appreciated that since smaller sized characters are produced by scaling the common font data stored in the storage means, the width of each character space will vary with the character height which, as explained above, varies according to the number of lines to be printed. The controller can still operate to determine the breadth of the label by determining the aggregate of the widths of each character space when the final label has been composed. The label length is determined from the longest line of print in the label.

According to a still further aspect of the invention there is provided a label printing apparatus comprising: input means for selecting characters for composing a label to be printed; display means for displaying the characters selected at the input means; printing means for printing said characters on an image receiving tape to produce a label; and a controller operable to determine an appropriate character size such that the number of characters selected by a user can be accommodated in a length of tape selected by the user.

The above facilities of the controller can be provided to facilitate use of the printing apparatus, but it will be apparent that means can be provided to override these operations of the controller and to select any arrangement of character sizes and layout according to a user's requirements. Any selected character size and layout will be displayed by the display means.

Where a label is being composed which has a length longer than that which can be displayed by the display means, the controller can cause the display means to display the part of the label which is currently being composed.

According to another aspect of the present invention there is provided a label printing apparatus comprising: input means for selecting characters for comparing a label to be printed; display means for displaying the characters selected at the input means; printing means for printing said characters on an image receiving tape to produce a label and comprising a column of thermal printing elements; storage means for storing font data from which said characters are derived for printing, said font data being Bezier data defining Bezier points for lines and/or curves of said characters; and a controller for deriving said characters from said font data, said controller being operable to determine sequentially for each of a plurality of print locations spaced widthwise across the character intersections of lines and/or curves of that character with a print line extending heightwise of the character at each print location and to generate therefrom a set of pixel data for supply to the printing means to control said column of thermal printing elements to print a column of dots corresponding to the set of pixel data defined at that print line.

According to a further aspect of the present invention there is provided a method of recreating a character from stored font data in the form of Bezier data defining Bezier points for lines and/or curves of the character, the method comprising: determining sequentially for each of a plurality of print locations spaced widthwise across the character intersections of lines and/or curves of that character with a print line extending heightwise of the character at each print location; and generating therefrom a set of pixel data to define a column of dots corresponding to that print line.

In a label printing apparatus, the set of pixel data which is generated can be supplied to a printing means comprising a column of thermal printing elements to print the column of dots. The successive printing of the sequentially produced columns will recreate the character.

According to a still further aspect of the invention there is provided a label printing apparatus comprising: input means for selecting characters for composing a label to be printed; display means for displaying the characters selected at the input means; printing means for printing said characters on an image receiving tape to produce a label; and a controller operable to control the display to implement a preview function which enables an entire label which has been formulated by a user to be displayed at one time on the display means, said preview function being implemented by reducing the size of the characters to be displayed to such an extent that all of the selected characters can be displayed on the display means.

Label printing apparatus according to the present invention can provide a so-called preview function. Characters which are selected for display and printing are identified by storing in a controller memory the location in the storage means which stores font data for that character together with attribute data concerning that character. This attribute data can define the type of character or characters to be printed, e.g. bold, italic or outline or the size of the character to be printed. Each line of characters to be printed is stored as a character string defining said character locations and attribute data. When a user wishes to implement the preview function, a preview key is depressed and the controller is caused to calculate the length of the label which has been formulated. The controller then compares the length of the label with the available width of the display means and selects a scaling factor from this comparison which will enable the entire label to be viewed on the display means. The scaling factor is applied to the font data stored in the storage means to reduce the size of the characters to be displayed. This enables an entire label to be viewed before printing.

For a better understanding of the present invention and to show how the same may be carried into effect, reference will now be made by way of example to the accompanying drawings.

DESCRIPTION OF THE PREFERRED EMBODIMENTS

Figure 1:
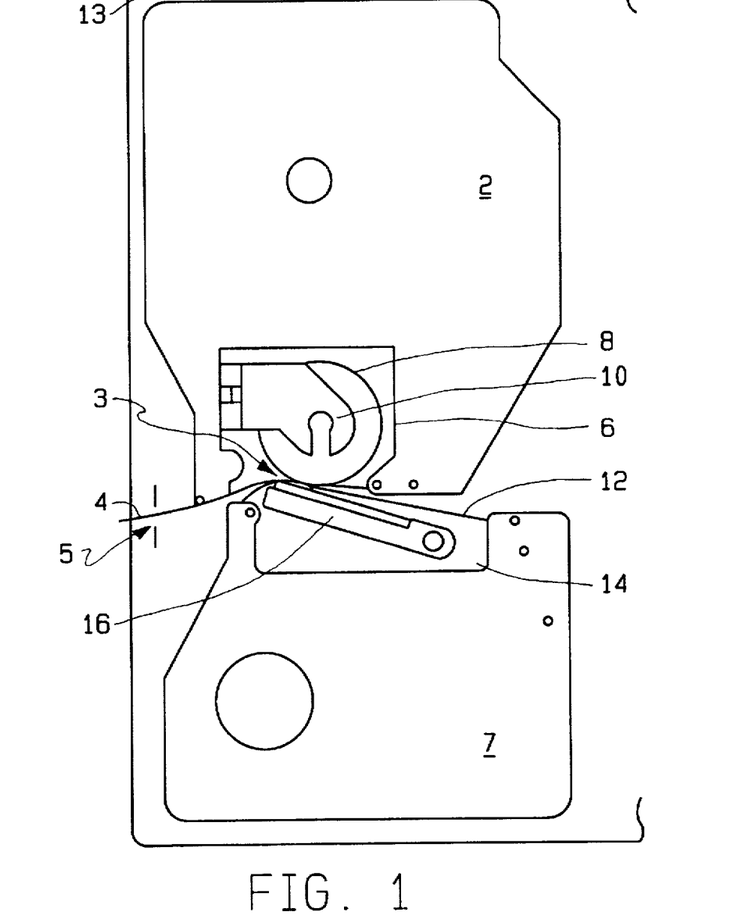
FIG. 1 is a plan view showing two cassettes inserted in a printing device.

FIG. 1 shows in plan view two cassettes arranged in a cassette receiving bay 13 of a printing device. The upper cassette 2 contains a supply of image receiving tape 4 which passes through a print zone 3 of the printer to an outlet 5 of the printer. The image receiving tape 4 comprises an upper layer for receiving a printed image on one of its surfaces and having its other surface coated with an adhesive layer to which is secured a releaseable backing layer. The cassette 2 has a recess 6 for accommodating a platen 8 of the printer. The platen 8 is mounted for rotation within a cage moulding 10. The lower cassette 7 contains a thermal transfer ribbon which extends from a supply spool to a take-up spool within the cassette 7. The thermal transfer ribbon 12 extends through the print zone 3 in overlap with the image receiving tape 4. The cassette 7 has a recess 14 for receiving a print head 16 of the printer. The print head 16 is movable between an operative position, shown in FIG. 1, in which it bears against the platen and holds the thermal transfer ribbon 12 and the image receiving tape in overlap between the print head and the platen and an inoperative position in which it is moved away from the platen to release the thermal transfer ribbon and image receiving tape. In the operative position, the platen is rotated under the action of a stepper motor to cause image receiving tape to be driven past the print head and the print head is controlled to print an image onto the image receiving tape by thermal transfer of ink from the ribbon 12. The print head is a conventional thermal print head having a column of pixels each of which can be thermally activated in accordance with the desired image to be printed.

Figure 2:
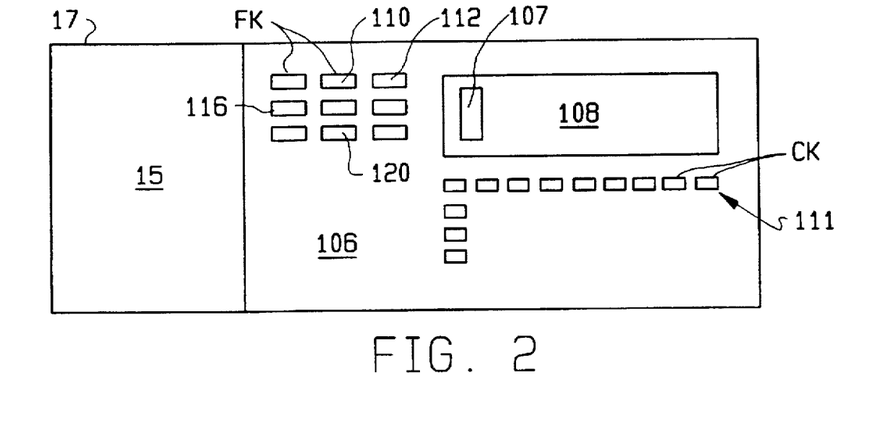
FIG. 2 is a plan view of the top surface of the printing device.

FIG. 2 is a view of the printer from above. The cassette receiving bay 13 is covered by a lid 15 which is hinged along the line 17 at the rear of the printer and which can be opened from the front to reveal the cassettes in the cassette receiving bay 13. The printer also has a keyboard 106 which has a plurality of character keys CK designated generally by arrow 111 and a plurality of function keys FK which are designated by way of example with reference numerals 110,112,116 and 120. The printer also has a display 108 which is a liquid crystal graphics display.

Figure 3:
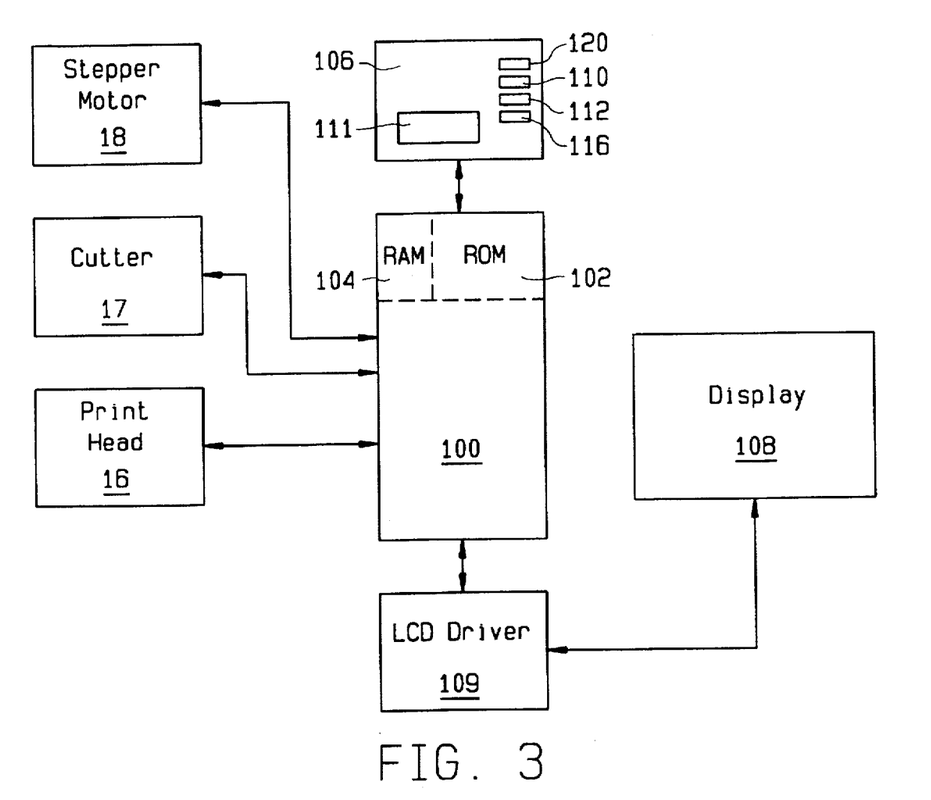
FIG. 3 is a diagrammatic sketch showing the control circuitry for the printing device.

The basic circuitry for controlling the printing device is shown in FIG. 3. There is a microprocessor chip 100 having a read only memory (ROM) 102, a microprocessor 101 and random access memory capacity indicated diagrammatically by RAM 104. Additional ROM and RAM capacity can be provided by separate ROM and RAM chips connected to the microprocessor. The microprocessor 101 is connected to receive data input to it from a data input device such as the keyboard 106. The microprocessor chip 100 outputs data to drive the display 108 via the display driver chip 109 and also to drive the print head 16 and the stepper motor 18 for controlling the platen 8. The microprocessor chip also controls a cutting mechanism indicated diagrammatically in FIG. 3 by cutter 17 to cut the printed tape.

The ROM 102 stores font data for defining a set of scalable alphanumeric characters, the largest size being in this example a character height of 15.5 mm and a width of about 10 mm depending on the nature of the character.

The liquid crystal display 108 has approximately the same height as the largest breadth of the image receiving tape, that is, in the particular example, 19 mm. Other breadths of image receiving tape can be accommodated. The display has a pixel matrix of 3168 dots, with 32 dots in each column and having 99 columns. The print head 16 has one column containing 128 dots or pixels. This arrangement enables the display 108 to represent each character with one quarter of the resolution with which it is printed at the print head since the characters for display by the display means are derived from the font data stored in the ROM 102, the same font data being used to provide the characters for printing by the print head 16. When tapes of different breadths are inserted into the printing device, an automatic sensing arrangement determines the breadth of the tape and causes the controller to blank out upper and lower bands on the display to leave a clear part corresponding to the breadth of the tape. A suitable sensing arrangement is disclosed in our British Application No. 9212004.7, the contents of which are herein incorporated by reference. There can be stored a different menu of character sizes for each breadth of tape, from which a user can make his size selection.

Figure 4:
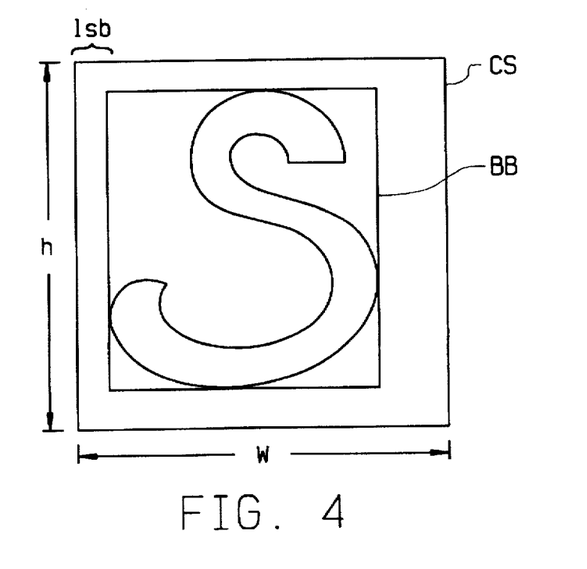
FIG. 4 is a diagram showing the information stored with each character.

As shown in FIG. 4, the font data for each character defines a predetermined character space CS having a height h (measured in the direction of the breadth of the image receiving tape) and a width w (measured in the direction of the length of the image receiving tape). Each character is also stored with data defining its bounding box, denoted by the line BB, which is the box defined by the outermost coordinates of the character. The character space defines the normal space occupied by the character and its relation to other characters. The relationship between the bounding box BB and the character space CS is determined by the distance between their left hand edges (the left side bearing lsb). For characters such as a "j" for example, the left side bearing can have a negative value, that is the leftmost edge of the bounding box BB can lie to the left of the leftmost edge of the character space CS.

It will be appreciated that different variations of the characters can be produced from the common font data stored in a ROM 102 by manipulation by the microprocessor 101 using the memory capacity of the RAM 104. Scaling of the common font data is also carried out to produce characters of different sizes to be printed, the normal or default character size being the largest permissible sized character for a particular tape breadth. As described later, Bezier font data stores the relationship between features of a character. In order to display or print the character an appropriate scaling factor must be applied to the font data.

As the same font data is used to generate the characters both for display at the display 108 and printing at the print head 16 the spacing of the characters on the display 108 is proportional to that which will appear on the finished label. This has a big advantage to the user since characters are thus displayed with the relative size and spacing with which they will appear on the finished labels. Furthermore, where a multiple line label is to be produced, the display 108 is capable of displaying each line with its appropriate character sizes and layout as it will appear on the finished label. Additionally, the displayed character will resemble the printed character in terms of its relative features.

For features which cannot be displayed on the display 108, because the display does not have sufficient resolution to illustrate the particular form of the character, such as bold or outlined characters, a set of icons is displayed on the side of the display to provide this information. Where the number of characters is such that the length of the final label exceeds the length of the display, the part of the label currently being edited is shown on the display.

Use of the printing device will now be described. Characters to be printed are entered into the printing device using the character keys designated generally by the block 111 but in practice comprising a plurality of lettered and numbered keys CK. As each character is entered using the keyboard 106 it is supplied to the microprocessor 101 which drives the display 108 to display the characters as they are inputted. To do this, for each character which is entered, the microprocessor calls up the stored font data for forming that character from the ROM 102. As the character is stored in compressed form, this font data is then moved temporarily to the RAM 104 and is manipulated by the microprocessor 101 to generate pixel data to form the character. This pixel data is transmitted column by column in one form to the display 108 and in another form to the print head 16 for printing. The form of the pixel data takes into account the difference in resolution between the character to be displayed and the character to be printed. Character data is not passed to the print head for printing until a print operation is executed. Firstly, the characters for the label are entered and edited using the function keys on the keyboard 106 in conjunction with the display 108.

The function keys enable different versions of the stored characters to be selected, that is larger or smaller characters or stylised versions of the characters such as bold or outlined. Different sizes of the character are displayed on the display means in proportion to the way in which they will be printed on the finished label.

Each character is associated with a predetermined character space having a height and width as explained above. This height and width vary with the size of the character but in any event for each character the microprocessor determines the width of the associated character space and can use this in one mode of operation for determining the overall length of print on a label. A finished label will include not only a printed portion but also blank lead and lag spaces which are also computed by the microprocessor 101 to determine the final length of the label. The overall length of the label is then stored in the microprocessor and used to control the cutting operation required to produce the label.

In another mode, the user can input the length of label which he requires and then input a number of characters. The microprocessor then determines the most appropriate character size to accommodate the selected number of characters in that given label length. This character size is then displayed on the display 108 so that a user can visualize the finished label easily.

Figure 5A:
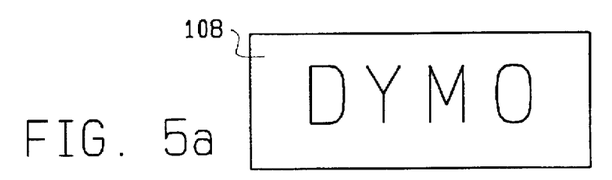
FIGS. 5a and 5b are diagrams of the display means in use to display multiline labels.
Figure 5B:
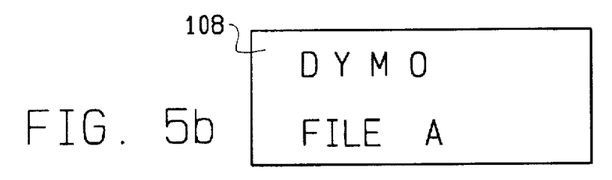

The production of multiple line labels will now be described with reference to FIGS. 5a and 5b. The first line of print is entered by selecting a number of characters as described above. These characters are displayed on the display means with the largest permissible character height for the breadth of inserted tape. If the number of characters entered is such that the width of the display is exceeded, the display scrolls to display the characters as they are entered. When a user presses a return key on the keyboard and begins to enter the next line of data, the controller will automatically drive the display means so that the first line of print is displayed with half of its original character height and the characters being entered in the second line will then be entered with characters of height to match those in the first line. This will occur for the number of lines to be input, typically four for a tape having a width of 19 mm.

The user himself can override the automatic multiple line display facility as described above and can enter characters of his own selected size and these will be displayed accordingly proportionally spaced. This enables a user to edit the label using the display with certainty that the displayed version of the label will closely match that which is produced ultimately by the print head 16.

The user can produce a label having different pages, each page being a block of text occupying a section of the label. Pages can have different formats.

There follows a more detailed description of how the control circuitry operates to store and generate characters and to implement the functions outlined above.

Each character and icon which can be displayed and printed is stored in the font ROM 102 as a set of Bezier data. Bezier data is known as a storage format for characters and essentially involves the storage of each character as data defining a set of lines and curves. As is known, lines are defined by the coordinates on an (x,y) matrix of each of the end points of the line. Curves are defined by the (x,y) coordinates of three points which are defined by the Bezier equation $$P(t)=(1-t)^2A+2t(1-t)B+t^2C$$

which defines a curve P as a function of t where A,B,C are the three points which are stored as the Bezier data for the curve P(t).

Bezier data defining each character is stored in a particular memory space in the font ROM 102. When a key CK on the keyboard 111 is depressed to select a particular character, a signal from that key goes to address a look-up table which identifies the memory space in the font ROM 102 for that character. If the character is to be displayed or printed, the character data is called over to the RAM 104 of the microprocessor to recreate the character for display and/or printing.

Figure 6:
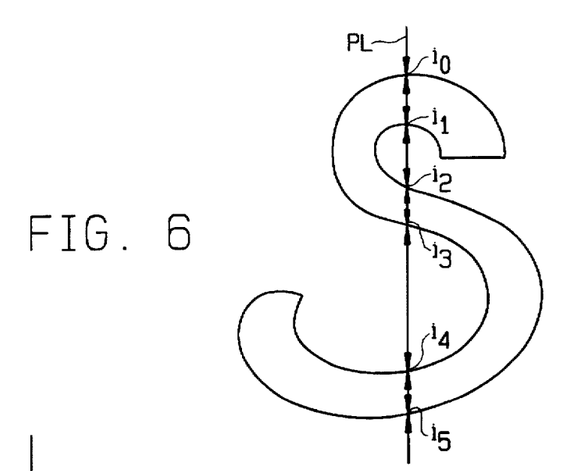
FIG. 6 is a letter "S" showing intersection points.
Figure 7:
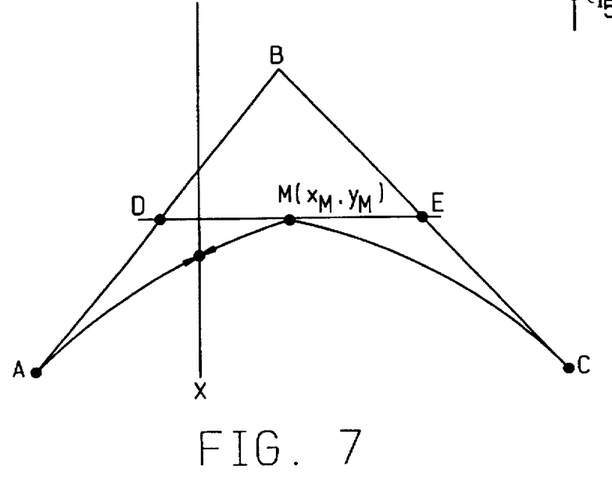
FIG. 7 is a diagram illustrating how the intersection points are calculated.

When a print instruction has been received, recreation of the character is done column by column, each column of pixel data being supplied to the printhead for printing while a next column of pixel data is produced. In the described arrangement, the printhead has 128 thermal elements arranged in a column so that for each character a plurality of columns of 128 pixels are produced, each pixel being represented by a one or a zero. Thermal elements receiving pixel signals of logic one are activated to print while thermal elements receiving pixel signals of logic zero are not. Each column of pixels is produced by determining the points of intersection of a print line with the character outline, as shown in FIG. 6 which illustrates the letter "S". The print line is designated PL and the points of intersection are denoted $i_o \ldots i_5$. FIG. 6 shows the principle for ease of understanding: in practice, the letter "S" is not recreated from the Bezier data and then scanned. Instead, the intersection points are calculated using data defining the position of the print line relative to the bounding box BB and the stored Bezier data for that character using an iterative algorithm which continually bisects each curve defined by the Bezier data. This is illustrated in FIG. 7 where A,B and C denote the Bezier points defining the curve A,M,C. The coordinates $x_M, y_M$ of the "on curve" point M can be obtained by taking the mid-point of the line which joins the mid-points of the lines AB and BC. The position of the print line PL is denoted by "x". If the coordinate $x_M$ of the point M equals the position x of the print line, the intersection point i has a y coordinate $y_i$ equal to $y_M$. If this condition is not satisfied, the original curve is split into two smaller curves defined by A,D,M and M,E,C and another iteration is done on the curve containing x (A,D,M in FIG. 7). In this way the microprocessor calculates the intersection points $i_o \ldots i_5$ in FIG. 6. The column of pixel data for the print head is produced by generating zeros until the first intersection location $i_o$ is reached, then generating ones until the next intersection $i_1$ is reached, then changing to zeros and so on until data for 128 pixels has been generated. This data is then transmitted to the print head and a column is printed. While this is being done, the next column of pixel data for the print head is being calculated. Once a column has been printed, the stepper motor controls the platen to rotate to move the image receiving tape 4 through one column width.

After calculating the intersection points, the RAM space required for generating the print data is relatively small, 128 bits for a column of print data and 1 byte for each intersection location. This thus reduces the overall memory requirement for the printer.

The number of print lines required to recreate a character for printing depends on the size of the character to be printed. In the described example, the print head prints 8 dots per mm across a label. The character to be displayed is also derived from the Bezier data for that character in a manner similar to that outlined for printing, except that the character is first scaled down, in this example by one quarter of the printed size. This is done by dividing all of the coordinates of the Bezier points by four and then proceeding as above to generate pixel data for transmission to the display column by column.

This method of storage and recreation also allows characters to be scaled for printing, still retaining their proportions and relative character spacing. When characters are input using the keys CK on the keyboard 111 during formulation of a label, the size of the character can be altered by depressing a size key 112 on the keyboard. This is stored as a scaling byte which is used by the microprocessor in recreation of the character to scale the Bezier coordinates before the pixel data for the print head is generated column by column as described above. The scaling of the Bezier data also affects the character space CS (see FIG. 4) which decreases or increases in size according to the scaling factor selected by the size key. When a label is being formulated, data defining the label is stored as a sequence of bytes defining a character with characters and spaces and attributes (including scaling information). The label length is determined by adding together the widths of the character spaces after any required scaling and any blank spaces which the user has inserted using the blank key on the keyboard. The length of the label is based on the longest line in the formulated label. If a user has already input a desired label length, the actual label length created by the user during formulation is compared with this. If the actual label length exceeds the preset label length, the microprocessor rescales the characters by an amount which will enable the formulated label to fit within the predetermined length, if this is possible. If the actual label length is less than the preset length, the microprocessor calculates leaders and trailers to utilise the remaining length of label.

The storage of characters in a Bezier format enables scaling to be accomplished using any scaling factor while retaining proportionality and relative character spacing. This enables a large variety of sizes to be available to a user. The recreation of the displayed character from the same data as the character to be printed enables a user to see precisely the label he is formulating. The described printing device also provides an additional function to assist the user in label formulation, namely a so-called "preview function". When the preview key on the keyboard is depressed, the microprocessor causes all the characters to be reduced in size to such an extent that the whole label which has been formulated appears on the display simultaneously with the same layout as that which will be printed. While the size reduction might be such that individual characters are indecipherable, the overall appearance of the label can be ascertained before printing, and if necessary modified before the print key 120 is depressed. The scaling factor for the preview function is calculated by the microprocessor by calculating the length of the label (as described above) and comparing this to the length of the display, additionally dividing by four to take into account the difference in resolution between printing and displaying.

The printing device thus provides several user friendly functions, including in particular selection of label length and preview function. In the described embodiment a user can set a fixed length label between 40 mm and 300 mm. Once a user has formulated his label, the microprocessor calculates the actual length by calculating the width of each character of each line of the label and displays the length of the longest line plus a 20 mm leader and 20 mm trailer in a dialogue, box 107 (FIG. 2) on the display 108. At this point the user can increment or decrement the label length between the label length limits. In this case where the label length is enlarged the additional label length is added on both sides of the label text. In the case where the label length is reduced the microprocessor scales the text to fit the longest line within the requested length. For example:

| | | |
|---|---|---|
| Displayed label length | = | 90 mm |
| User reduces this to 65 mm | | |
| Actual original text length | = | 90–40 mm (leader and trailer) |
| | = | 50 mm |
| Requested actual length | = | 65–40 mm |
| | = | 25 mm |
| Scaling required | = | Requested actual length/Actual original length |

After this the whole label is scaled by this factor. If further text is added the required overall scaling is recalculated. This is no lower limit on the label length, allowing the software to scale the text until it disappears and the scaling factor allows the text to be scaled to any size to fit the requested length.

The preview function allows the user to see a scaled version of the label such that the layout of the entire label may be seen on the display, even when the label includes a plurality of pages of different formats.

In multiple line printing, in autosize mode, after a first line of characters has been displayed with a certain size resulting from the application of a particular scaling factor to the font data, a return key is depressed indicating that a second line is to be entered. Depression of the return key causes the controller to modify the scaling factor to display half size characters and the modified scaling factor is stored. This is repeated for subsequent entering of new lines. The scaling factors (or bytes) for printing are derived from the stored, modified scaling factors.

In both these cases the functions are available because of the properties of Bezier fonts. Since the characters are constructed from a series of lines and Bezier curves each character may be scaled to any size by use of a single scaling factor during the calculation of all the points on the character. This effect results in the limitation of final character quality being either the resolution of the display when editing or the resolution of the print head on the final printed label. In the described case the resolution of the display is chosen Go be exactly one quarter that of the print head, i.e. 32 dots high versus 128 dots high for the print head, such that the display scaling factor is exactly one quarter of that utilised at the print head.

What is claimed is:

1. A label printing apparatus comprising:
   input means for selecting characters for composing a label to be printed;
   display means for displaying the characters selected at the input means;
   printing means for printing said characters on an image receiving tape to produce a label;
   storage means for storing font data defining a plurality of characters;
   a controller for recalling font data for characters selected at the input means and operable to produce pixel data for driving the display means whereby the characters displayed on the display means resemble the characters which are printed by the printing means; and
   a sensing arrangement to determine the breadth of the tape and to cause the controller to leave a clear part on the display corresponding to the breadth of the tape.

2. A label printing apparatus as claimed in claim 1, wherein the controller is operable to blank out upper and lower bands on the display to define said clear part.

3. A label printing apparatus as claimed in claim 1, wherein a different menu of character sizes associated with each breadth of tape usable with the label printing apparatus is stored.

4. A label printing apparatus according to claim 1, wherein the characters are printed by the printing means with four times the resolution with which they are displayed on the display means.

5. A label printing apparatus according to claim 3, wherein different sizes of characters can be selected in response to user control of the input means, the different sized characters being produced by altering scaling factors applied to the font data stored in the storage means.

6. A label printing apparatus according to claim 1, which is operable to print a plurality of lines on said image receiving tape, one line being below another, and to automatically select the appropriate character size for printing and displaying such multiple lines.

7. A label printing apparatus as claimed in claim 1, wherein the font data is Bezier data, defining Bezier points for lines and/or curves of the character.

8. A label printing apparatus as claimed in claim 7, wherein said printing means comprises a column of thermal printing elements; and the controller is operable to determine sequentially for each of a plurality of print locations spaced widthwise across the character intersections of lines and/or curves of that character with a print line extending heightwise of the character at each print location and to generate therefrom a set of pixel data for supply to the printing means to control said column of thermal printing elements to print a column of dote corresponding to the set of pixel data defined at that print line.

9. A label printing apparatus according to claim 8, wherein the controller is operable to apply a scaling factor to the Bezier data before deriving said characters.

10. A label printing apparatus according to claim 1, which is operable to implement a preview function which enables an entire label which has been formulated by a user to be displayed at one time on the display means.

11. A label printing apparatus as claimed in claim 10, wherein said preview function is implemented by reducing the size of the characters to be displayed to such an extent that all of the selected characters can be displayed on the display means.

12. A label printing apparatus according to claim 10, wherein the controller is operable to implement a preview function which enables an entire label which has been formulated by a user to be displayed at one time on the display means by applying a scaling factor to said Bezier font data, said scaling factor being dependent on the number of characters selected by a user and their layout.

13. A label printing apparatus according to claim 1, wherein common font data stored in the storage means defines each character within a predetermined character space having a height and a width defined by the nature of the character and its normal spacing with respect to adjacent characters.

14. A label printing apparatus according to claim 1, wherein the controller is operable to determine the length of a label from the aggregate of the width of characters selected by a user, the sizes of the characters having also been selected by the user.

15. A label printing apparatus according to claim 1, wherein the controller is operable to cause a plurality of character sizes to be displayed sequentially on the display means in response to a user request so that the user may select one of said displayed character sizes.

16. A label printing apparatus as claimed in claim 1, wherein said controller is operable to determine an appropriate character size such that the number of characters selected by a user can be accommodated in a length of tape selected by the user.

17. A label printing apparatus according to claim 16, which comprises storage means for storing font data defining a plurality of characters and wherein the controller is operable to apply a scaling factor to said font data according to said appropriate character size.

18. A method of displaying a label to be printed on an image receiving tape using a printing device comprising the steps of:
    selecting characters for composing a label to be displayed and printed;

sensing the breadth of image receiving tape received in the printing device; and displaying on a display the selected characters, wherein a clear part is left on the display corresponding to the sensed breadth of tape.

19. A method as claimed in claim 18, further comprising the steps of:

recalling from a storage means font data defining said selected characters;

applying a first scaling factor to said font data to generate first pixel data defining characters of a first desired size;

supplying said first pixel data to the display for displaying said selected characters;

applying a second scaling factor to said font data to generate second pixel data defining characters of a second desired size; and supplying said second pixel data to a printing means of said printing device to print said selected characters.

20. A method according to claim 19, further comprising the steps of:

selecting characters for printing on a first line of a label, said first scaling factor being selected to display characters of the first desired size; and selecting a second line printing mode and, responsive to said selection of second line printing, altering the first scaling factor to display characters smaller than said first desired size.

21. A method according to claim 19, wherein the second scaling factor is derived from the first scaling factor.

22. A method as claimed in claim 18, wherein a character is recreated from stored font data in the form of Bezier data defining Bezier points or lines and/or curves of the character, further comprising the steps of:

determining sequentially for each of a plurality of print locations spaced widthwise across the character intersections of lines and/or curves of that character with a print line extending heightwise of the character at each print location; and generating therefrom a set of pixel data to define a column of dots corresponding to that print line.

23. The method of claim 18, further comprising a step of printing characters on the tape.

24. The method of claim 23, wherein the characters displayed resemble the printed characters.

25. A label printing apparatus comprising:

an input for selecting characters for composing a label to be printed;

a display for displaying the characters selected at the input;

a printer for printing the characters on an image receiving tape to produce a label;

a memory for storing font data defining a plurality of characters;

a controller for recalling font data for characters selected at the input and being operable to produce pixel data for driving the display; and a sensing arrangement for determining the breadth of the tape and to cause the controller to leave a clear part of the display corresponding to the breadth of the tape.

26. The apparatus of claim 25, wherein the characters displayed on the display by the controller resemble the characters that are printed by the printer.

27. The apparatus of claim 25, wherein the controller is operable to blank out upper and lower bands on the display for defining the clear part.

\* \* \* \* \*

UNITED STATES PATENT AND TRADEMARK OFFICE
CERTIFICATE OF CORRECTION

PATENT NO. : 5,733,051
DATED : March 31, 1998
INVENTOR(S) : Beadman et al.

It is certified that error appears in the above-identified patent and that said Letters Patent is hereby corrected as shown below:

Column 13,
After line 33, claim 28 should appear as follows:
-- 28. A label apparatus comprising:
   input means for selecting characters for composing a label to be printed;
   display means for displaying the characters selected at the input means;
   printing means for printing said characters on an image receiving tape to produce a label; and
   a controller operable to control the display to implement a preview function which enables an entire label which has been formulated by a user to be displayed at one time on the display means, said preview function being implemented by reducing the size of the characters to be displayed to such an extent that all of the selected characters can be displayed on the display means. --

Signed and Sealed this

Twenty-eighth Day of May, 2002

*Attest:*

JAMES E. ROGAN
*Attesting Officer*    *Director of the United States Patent and Trademark Office*